United States Patent [19]
Odom et al.

[11] 3,739,985
[45] June 19, 1973

[54] IRRIGATION EQUIPMENT FOR TRACTOR

[76] Inventors: Richie G. Odom; Carson W. Fowler, both of P. O. Box 151, Ashburn, Ga. 31714

[22] Filed: Oct. 27, 1970

[21] Appl. No.: 84,280

[52] U.S. Cl. ............ 239/172, 239/199, 242/86.5, 137/355.16
[51] Int. Cl. ............................................ E01h 3/02
[58] Field of Search ............... 239/172, 178, 183, 239/184, 189, 195, 196, 197, 199, DIG. 1; 242/86.5; 137/355.16

[56] References Cited
UNITED STATES PATENTS

| | | | |
|---|---|---|---|
| 3,507,336 | 4/1970 | Nelson | 239/183 X |
| 2,570,573 | 10/1951 | Liboiron | 239/178 |
| 3,477,643 | 11/1969 | Bruninga | 239/184 X |
| 3,356,341 | 12/1967 | Brown | 242/86.5 X |
| 240,602 | 4/1881 | McGaffey | 239/199 X |
| 1,176,856 | 3/1916 | Salmond | 239/189 |
| 1,653,103 | 12/1927 | Keys | 239/199 |
| 1,784,251 | 12/1930 | Plumer | 239/197 X |
| 2,694,600 | 11/1954 | Richey | 239/195 X |
| 3,523,520 | 8/1970 | Evans | 239/178 X |
| 3,628,731 | 12/1971 | Phillips | 239/189 |

Primary Examiner—Robert S. Ward, Jr.
Attorney—Patrick F. Henry

[57] ABSTRACT

A method of irrigating a large tract of farm land without the use of permanent irrigation sprinkler systems, ditches, pipes and the like. Defining the tract in a general rectangular or square shape, sections of conventional aluminum or other irrigation pipe which may be rigid are detachably coupled together and led to the source of water usually a farm pond or lake and suitable pumping equipment is used with gasoline or diesel engines to suck the water from the pond or lake and deliver it at proper pressure through the base piping which is sort of in the middle of the tract. Flexible irrigation hose coiled on a large reel has one end detachably attached to the outlet end of the base pipe system and is supported on a three-point tractor hitch from which there is a power take-off means selectively to drive the hose reel to wind or unwind. A large, conventional farm-type irrigation sprinkler head is mounted on the frame with the reel and is driven by the water pressure from the flexible hose. The tractor unwinds the reel to the far end of the tract from the sort of central base piping system and then takes stationary position with the sprinkler operating or travels slowly substantially in a straight line from one side of the tract to the other, turning towards the unwatered tract after reaching the far side, detaching whatever base piping is necessary, adjusting the flexible hose to reel or unreel as required and proceeding to water the remainder of the tract in this fashion. The frame supporting the reel on the three-point hitch of the tractor includes suitable roller guide means and may be adjusted from the tractor by the three-point hitch.

6 Claims, 3 Drawing Figures

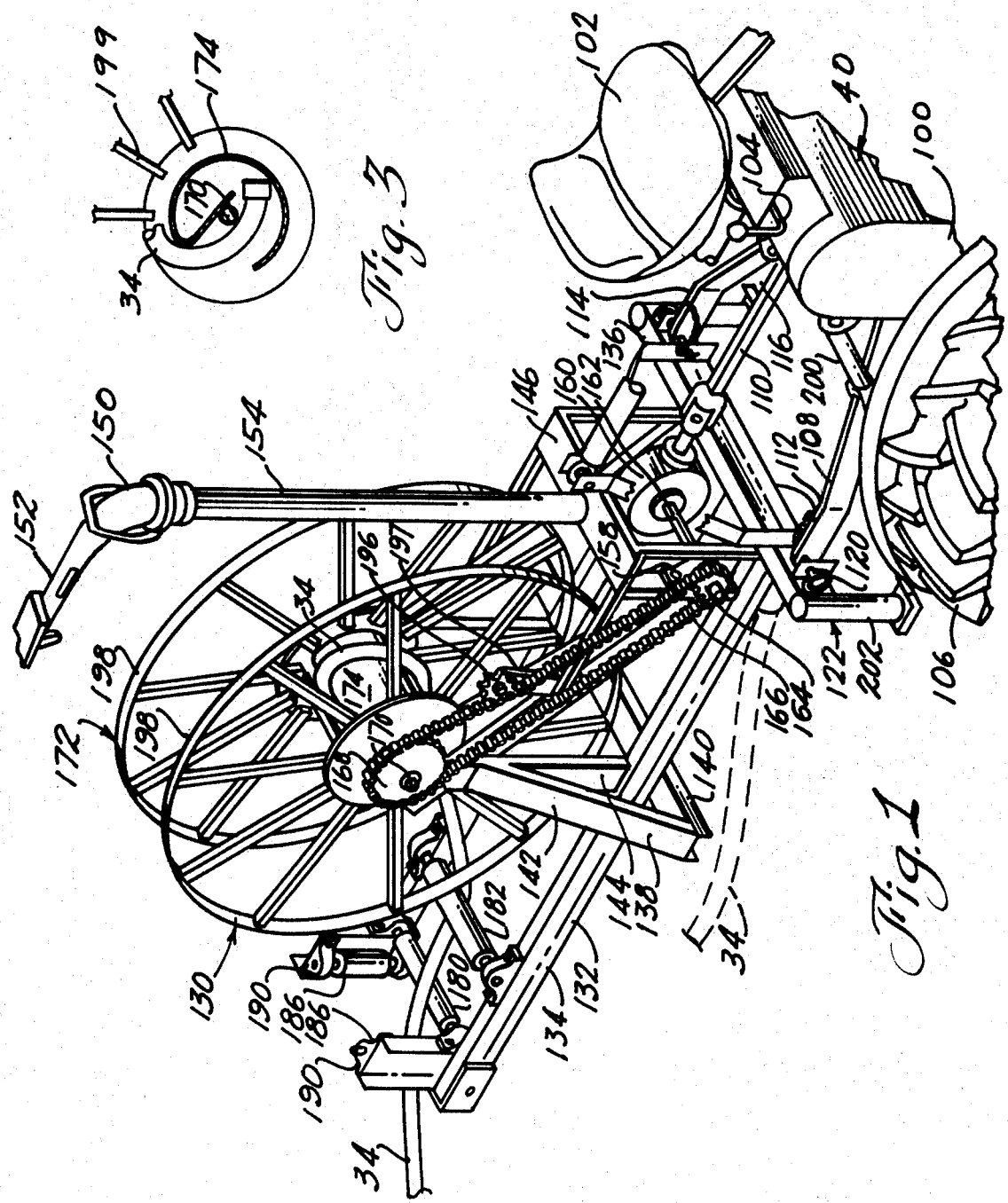

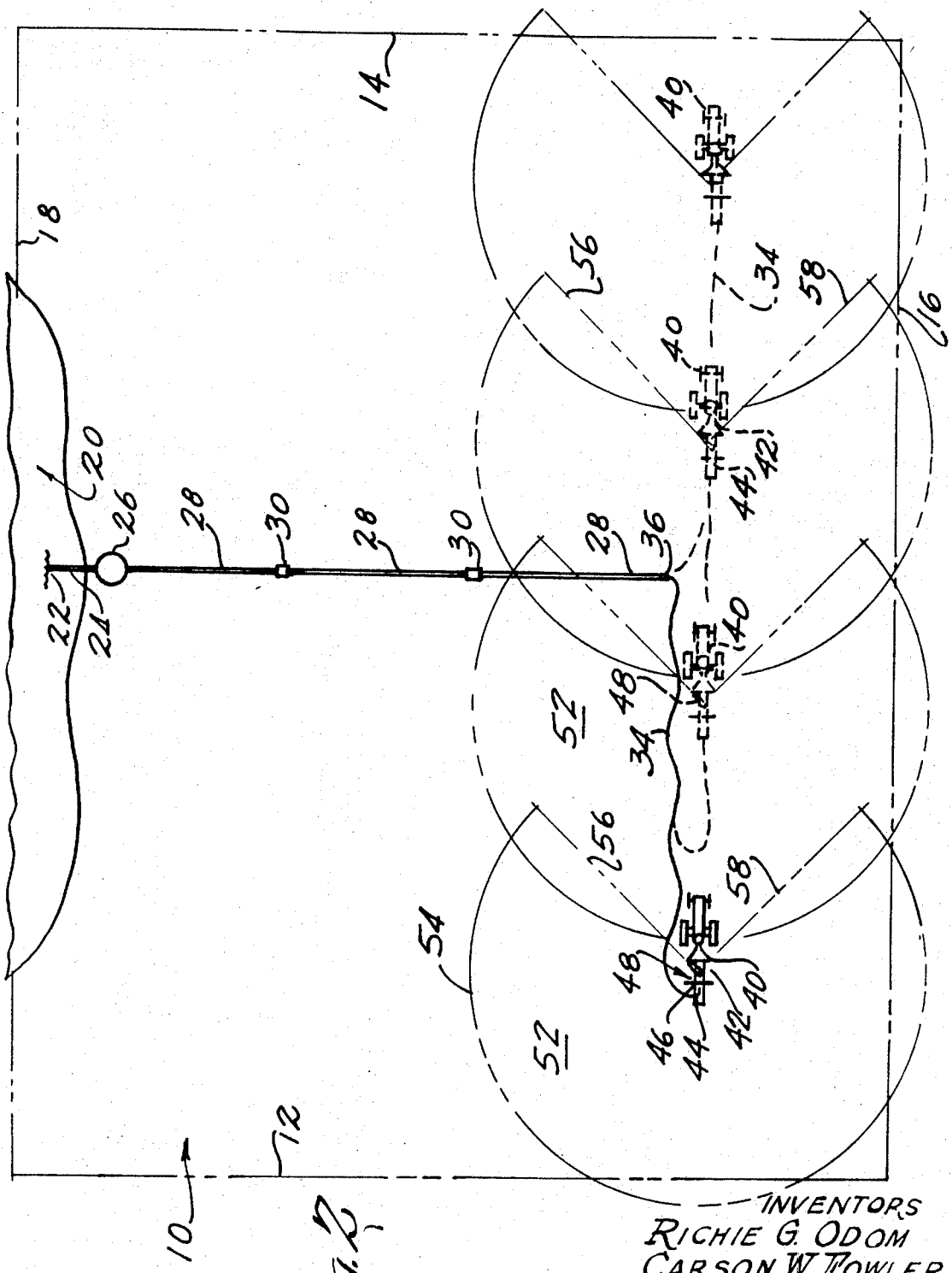

3,739,985

IRRIGATION EQUIPMENT FOR TRACTOR

BACKGROUND OF THE INVENTION

1. Field of the Invention

Irrigation methods and equipment. Hose handling equipment particularly vehicle mounted as for example on a tractor.

2. Description of the Prior Art

Aside from the very old irrigation methods of providing gravity flow ditches and some way of directing water therethrough, the prior art includes above ground and under ground sprinkler systems installed throughout a tract or area which includes both permanent pipe and movable pipe. These systems are relatively quite expensive and a great deal of time is required both to maintain them and to move the sprinklers and the pipe from one location to another and to provide the water pressure and otherwise to maintain the system. While such systems may be practical for large permanent tracts that require constant and periodic irrigation, as for example in some areas of the Southwest United States which require constant irrigation, such systems are more costly and require more attention and maintenance than feasible for smaller tracts or periodic irrigation which is intermixed with natural rainfall. Underground sprinkler systems are also too expensive to install and maintain for certain types of use based upon rainfall and aboveground sprinkler systems using branches of pipe leading to different sprinklers require more attention and maintenance than the present arrangement.

SUMMARY OF THE INVENTION

Pumping water from a farm pond or other source through a base pipeline of detachable sections with the end leading to a convenient starting point for the present method, flexible hose is attached to the outlet and moved with a pulsating, rotating nozzle or other similar water disbursal means from one end of the tract past the outlet point of the base pipe and then to the other end of the tract at which time the direction of the travel may be reversed and one of the end sections of pipe of the base pipe may be removed so that a vehicle or other means may pass the outer end of the base piping system until the entire tract has been irrigated in this manner. Flexible hose is used from the end of the rigid base pipe and may be reeled in or out depending upon what is required at the particular location of the sprinkling at that time. This eliminates the need for permanent underground sprinkler pipes and permanent ditches or troughs in other types of irrigation. It also eliminates the use of a complete system of rigid plastic or metal piping and the inherent coupling, uncoupling and recoupling which must take place in such a system involving manpower expense and time. According to the present method the large rotating nozzle may be carried with the flexible reel on the back of a tractor with a three-point hitch and one nozzle and reel arrangement of this sort will accommodate the entire tract. No manual lifting of the apparatus is necessary once it is in place as it is moved by the tractor and adjusted by means of the three-point hitch and tractor power take-off. Thus the manual placement of sprinklers and pipe has been eliminated and delays have been minimized.

BRIEF DESCRIPTION OF THE DRAWING

FIG. 1 is a diagrammatic plan view of the practice of the present method on a typical tract using a tractor with a three-point hitch.

FIG. 2 is a perspective view of the hose storage means of the present invention supported on a three-point tractor hitch.

FIG. 3 is an enlarged cross-sectional view substantially vertically and medially through the cylindrical center portion of the hose reel shown in FIG. 1.

DESCRIPTION OF THE PREFERRED EMBODIMENT AND METHOD

In FIG. 1 a typical tract of land is designated generally by reference numeral 10 and as in the case of any tract of land may be generally reduced to a square or rectangular formation with boundaries 12, 14, 16 and 18 even though the tract 10 may be somewhat irregular. A typical farm lake or pond 20 provides an unlimited source of water but this also may be a county or city water supply or a storage tank or any other source. Through conventional pick-up means 22 (not shown) the water is directed through a section of rigid tubing or pipe 24 by means of a pump arrangement 26 which may comprise a gasoline or diesel engine (not shown) and a large water pump which delivers water at selected pressure through additional lines of tubing or pipe 28 which may be aluminum tubing, plastic pipe or galvanized steel or any other large irrigation pipe. According to conventional construction such pipe sections 28 are coupled together at couplings 30 that are readily attached and detached by hand. According to the present arrangement there are as many sections of pipe 28 from the pump 26 as necessary to find a convenient location far enough out in the tract 10 to start the irrigation sprinkling.

A substantial length of flexible tubing of rubber, plastic or the like 34 has one end detachably attached to 36 to the end of the pipe section 28 of the entire assembly of pipe sections 28 which are sometimes referred to as the base piping and the other end of the flexible tubing 34 or hose is carried by and stored on a movable transportation means such as a conventional farm tractor 40 carrying a three-point hitch arrangement 42 on which is suspended a frame 44 carrying a hose reel 46 and a large rotary, splash sprinkler nozzle assembly 48 to be described subsequently in connection with FIG. 2.

As seen in FIG. 1, tractor 40 unwinds the hose 34 and starts at a point at one end of the tract 10 with the sprinkler 48 operating to create an area 52 defined by an imaginary portion of a circle 54 depending upon the operation of the nozzle 48. Control means on the nozzle prevents the spraying forward of the lines 56, 58 to prevent the wetting of the tractor driver. Depending upon the amount of sprinkling and irrigation necessary and the volume of water to be delivered, the tractor 40 remains in each segment 52 moving from left to right in FIG. 1 in increments to cover all of the area with overlapping sections 52 and reeling in whatever hose 34 is not needed and unwanted as the tractor 40 approaches outlet end 36 and then unreeling the hose 34 again as the tractor travels from the outlet end 36 toward the right hand side of the tract 10 in FIG. 1. Regardless of the size of the tract 10 the tractor may proceed from one side across into the other side in the manner shown in FIG. 1 until that portion of the entire tract 10 has been irrigated at which time the tractor turns and moves down the length of permanent pipe 28 detaching any unwanted section 28 of pipe and reconnecting the end of the hose 34 and traveling again from right to left to cover that area of the tract 10. This is repeated from one side to the other with circles describing an area 52 until the entire tract has been watered. Each time any unwanted sections of pipe 28 are removed and the tractor passes again at the outlet point 30 between the flexible hose 34 and the rigid pipe 28 until the tract has been irrigated.

In FIG. 2 the tractor 40 is any conventional farm tractor having a frame 100 on which is mounted the seat 102 adjacent controls 104 and riding on large tractor tires 106 with a conventional three-point tractor hitch 108 mounted on the rear thereof and a power take-off 110.

The three-point tractor hitch comprises frame members 112, 114, and 116 detachably attached by means of pins 120 to the frame 122 of the suspended hose storage and sprinkler nozzle arrangement designated generally by reference numeral 130.

The hose reel and sprinkler nozzle arrangement 130 comprises a generally horizontal frame 132 comprising elongated steel frame members 134 to finding a substantially rectangular frame connected together by transverse members 136 welded thereto and supporting thereon a triangular hose reel frame 138 consisting of lateral steel channel members 140 and angular steel channel members 142 suitably braced by other members 144. A platform 146 is constructed from steel plate and supports a conventional rotating sprinkler nozzle arrangement 150 comprising a splash nozzle 152 rotatably mounted on a pipe 154 and of any conventional construction such as the "Big Gun" manufactured by E. R. Nelson Manufacturing Company, Inc., Peoria, Ill. The sprinkler arrangement per se does not form any part of the present invention since such agricultural irrigation sprinklers are well known.

Mounted on the platform 146 which also supports a journal 158 is a conventional gearbox 160 with an output shaft 162 supported in a journal 158 and having a sprocket 164 thereon on which is engaged a chain 166 around another sprocket 168 mounted on a shaft 170 of a large double hose reel 172 having a cylindrical center portion 174 on which is wound a flexible hose 34 of the type referred to previously.

Hose 34 travels across a rotatable sleeve roller assembly 180 and under another sleeve roller assembly 182 to the cylindrical portion 174 by which it is wound and from which it is unwound. One end of the hose 34 loops around the cylindrical center of the reel 172 and fastens in place for removal and attachment to the pipe 154 to deliver water under pressure thereto. Vertical sleeve rollers 186 mounted on opposite sides of the entrance to the reel 172 direct the hose 34 one way or the other and rotate in bearings in general bearing assemblies 190 thereon.

In the operation of the hose reel 130, elevation of the hose reel 172 and the entire frame 132 is controlled by raising or lowering the three-point hitch 108 from the controls provided on the tractor 40. In addition, the power take-off 110 is controlled in rotation in one direction or the other to control the direction of driving shaft 162 through the gearbox arrangement 160 thereby controlling the motion of the reel 172 to wind or unwind selectively the hose 34 thereon. The hose is directed smoothly across the sleeve rollers 186 on one side or the other and through the sleeve rollers 180, 182 on the frame 132 so as to remain always properly reeled in or reeled out without pinching or damaging the hose 34. An idler sprocket 196 is provided on a frame member 197 mounted on the base 132 to provide proper tension on the chain 166. Also, the reel 172 comprises two circular frames 198 having spokes 199 connected to a center hub arrangement which comprises the cylindrical center 174. Of course, as in the case of any farm implement it is easy to remove the entire assembly of the reel assembly 130 simply by removing the appropriate pins 120 from the three-point hitch 108 after dropping the frame 132 to the ground by control of the hydraulic cylinders 200 on the tractor 40 and allowing the device 132 to rest on legs 202.

While I have shown and described a particular method in accordance with the present invention together with the suggested piece of equipment which can be readily used to facilitate the practice of this method, this is by way of illustration only and does not constitute the only way of practicing the method or the only equipment that can be used since various alterations, changes, deviations, eliminations, omissions, additions, revisions and departures may be made in both the method and apparatus shown herein without departing from the scope of the invention as defined by interpretation of the appended claims.

What is claimed:

1. In an apparatus attached to and wholly supported on a three-point hitch on a tractor to be transported around a field for storing and letting-out or taking-in hose for irrigation:
   a. a tractor having wheels thereon,
   b. a hose storage frame extending from and wholly supported on said tractor by three-points on said frame attached to a three-point hitch on the tractor,
   c. a power take-off on said tractor,
   d. a hose storage reel mounted on the frame extending from said tractor and having one end of a water hose attached thereto, said hose storage reel being driven from said power take-off,
   e. a sprinkler mounted on said tractor behind the three-point hitch and ahead of said sprinkler on the frame, said frame being elongated behind said three point hitch and said frame being wholly supported from said hitch on said tractor, whereby said sprinkler is between said reel and said tractor, and one end of said hose being removable from said storage reel for connection to said sprinkler and the other end of said hose remote from said tractor being for connection to a water supply,
   f. and power transfer means between said power take-off and said hose storage reel for winding and unwinding said hose.

2. The apparatus in claim 1: said reel being driven by a chain, said chain driven from a transmission on said frame.

3. The apparatus in claim 2: said frame having a platform on which said sprinkler is mounted.

4. The apparatus in claim 3: said sprinkler being between said tractor hitch and said reel, said reel being mounted on a support on said frame comprising spaced upstanding members.

5. The apparatus in claim 4: there being rollers across which said hose is directed from the end of said frame.

6. The apparatus in claim 1: said three-point hitch having two spaced lower and one upper connections, there being hydraulic means operable from said tractor to control said hitch and said frame.

* * * * *